United States Patent
Butler et al.

(10) Patent No.: US 6,469,075 B1
(45) Date of Patent: *Oct. 22, 2002

(54) METHOD AND PREPARATION OF STABLE BITUMEN POLYMER COMPOSITIONS

(75) Inventors: James R. Butler, Houston; Kevin P. Kelly, Friendswood; Karen Scheel, Houston, all of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,671

(22) Filed: Nov. 14, 2000

Related U.S. Application Data (63) Continuation-in-part of application No. 09/389,785, filed on Sep. 3, 1999, now Pat. No. 6,180,697.

(51) Int. Cl.$^7$ ................................................. E08L 95/00
(52) U.S. Cl. .......................... 524/71; 524/59; 524/60; 524/62; 524/68; 524/69; 524/70
(58) Field of Search .............................. 524/59, 60, 62, 524/68, 70, 71

(56) References Cited

U.S. PATENT DOCUMENTS

| | | | |
|---|---|---|---|
| 3,803,066 A | 4/1974 | Petrossi | 260/28.5 |
| 4,129,542 A | 12/1978 | Matheson et al. | 260/28.5 |
| 4,130,516 A | 12/1978 | Gagle et al. | 260/28.5 |
| 4,145,322 A | 3/1979 | Maldonado et al. | 524/71 |
| 4,242,246 A | 12/1980 | Maldonado et al. | 524/71 |
| 4,412,019 A | 10/1983 | Kraus | 524/71 |
| 4,503,176 A | 3/1985 | Barlow et al. | 524/62 |
| 4,740,322 A | 4/1988 | DiBiase et al. | 252/47.5 |
| 4,956,500 A | 9/1990 | Vermilion | 525/54.5 |
| 5,017,230 A | 5/1991 | Hopkins et al. | 106/284.3 |
| 5,078,905 A | 1/1992 | Trinh et al. | 252/182.17 |
| 5,120,777 A | 6/1992 | Chaverot et al. | 524/62 |
| 5,151,456 A | 9/1992 | Elias et al. | 524/60 |
| 5,314,935 A | 5/1994 | Chaverot et al. | 524/64 |
| 5,371,121 A | 12/1994 | Bellomy et al. | 524/68 |
| 5,382,612 A | 1/1995 | Chaverot et al. | 524/60 |
| 5,508,112 A | 4/1996 | Planche et al. | 428/489 |
| 5,605,946 A | 2/1997 | Planche et al. | 524/68 |
| 5,618,862 A | 4/1997 | Germanaud et al. | 524/68 |
| 5,672,642 A | 9/1997 | Gros | 524/68 |
| 5,710,196 A | 1/1998 | Willard | 524/68 |
| 5,733,955 A | 3/1998 | Schulz et al. | 524/69 |
| 5,756,563 A | 5/1998 | Brandolese et al. | 523/350 |
| 5,756,565 A | 5/1998 | Germanaud et al. | 524/68 |
| 5,773,496 A | 6/1998 | Grubba | 524/68 |
| 5,795,929 A | 8/1998 | Grubba | 524/60 |
| 5,807,911 A | 9/1998 | Drieskens et al. | 524/68 |
| 6,133,351 A | 10/2000 | Hayner | 524/62 |
| 6,153,004 A | 11/2000 | Hayner | 106/274 |
| 6,180,697 B1 * | 1/2001 | Kelly et al. | 524/71 |
| 6,310,122 B1 | 10/2001 | Butler et al. | 524/60 |

OTHER PUBLICATIONS

Asphalt Instititue, Superpave Performance Graded Asphalt Binder Specification and Testing, 1997 Printing, pp 43–65.

* cited by examiner

*Primary Examiner*—Peter Szekeley
(74) *Attorney, Agent, or Firm*—Roberts, Abokhair & Mardula (57) ABSTRACT

The present invention provides a method for preparing an asphalt and thermoplastic elastomer composition. The process comprises heating an asphalt cut in a stirred tank to a temperature sufficient to allow the stirring of the asphalt in the tank. A thermoplastic elastomer or rubber is added to the asphalt while continuing to stir the asphalt. The mixture is stirred at a speed and for a period of time sufficient to increase the distribution of the elastomer into the asphalt. The stirring speed is reduced and the temperature is increased to add crosslinking agents to the tank. Stirring is continued for a period of time sufficient to improve the distribution of the crosslinking agent dispersion in the asphalt. Crosslinking agents comprise zinc 2-mercaptobenzothiole and elemental sulfur in a ratio of zinc 2-mercaptobenzothiazole to sulfur of 2.0/1.0. Useful concentrates are possible using this method while avoiding gel formation.

17 Claims, 1 Drawing Sheet

METHOD AND PREPARATION OF STABLE BITUMEN POLYMER COMPOSITIONS

CROSS REFERENCES TO RELATED APPLICATIONS

This application is a continuation-in-part of a prior U.S. Pat. No. 6,180,697, filed Sep. 4, 1999. 1999, Ser. No. 09/389,785 which has the title METHOD FOR PREPARATION OF STABLE BITUMEN POLYMER COMPOSITIONS and further has Kevin P. Kelly and James R. Butler as commonly named inventors.

This application claims priority under 35 U.S.C. 120 of U.S. Pat. No. 6,180,697, application Ser. No. 09/389,785 and contents of U.S. Pat. No. 6,180,697 are incorporated herein as if set forth in full.

BACKGROUND OF THE INVENTION

This invention is directed to bitumen compositions, which are prepared from bitumen, polymers such as copolymers of styrene and a conjugated-diene, and defined amounts of crosslinking agents such as sulfur. The bitumen compositions described herein are useful in industrial applications, such as in hot mix asphalts useful in preparing aggregates for road paving.

The use of bitumen (asphalt) compositions in preparing aggregate compositions (bitumen +rock) useful as road paving material is complicated by at least three factors, each of which imposes a serious impediment to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications designate a bitumen (asphalt) product, for example, AC-20R as meeting defined parameters relating to properties such as viscosity, toughness, tenacity and ductility (see Table 1). Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266°–446° F. (130°–230° C.), with 2 to 20% by weight of a block copolymer, having an average molecular weight between 30,000 and 300,000, with the theoretical formula S, -By, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. The preferred quantity of added sulfur cited in this patent is 0.1 to 1.5% by weight with respect to the bitumen. The resulting bitumen-polymer composition is used for road coating, industrial coating, or other industrial applications.

U.S. Pat. No. 4,130,516, issued Dec. 19, 1978 to Gagle et al., an asphalt (bitumen) polymer composition obtained by hot-blending asphalt with 3 to 7% by weight of elemental sulfur and 0.5 to 1.5% by weight of a natural or synthetic rubber, preferably a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styreneibutadiene rubber, with bitumen at 293°–365° F. (145°–185° C.), in an amount up to 10% by weight based on the bitumen, then adjusting the temperature to 257°–320° F. (125°–160° C.), and intimately blending into the mix an amount to sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality. Although polymer-modified bitumen compositions are known, these previously described compositions are not necessarily useful for road paving applications. For example, mixing NorthWest paving asphalt having an initial viscosity of 682 poise at 140° F. (60° C.) with 3.6 weight percent Kraton®-4141, a commercially available styrene-butadiene tri-block copolymer which contains 29 weight percent plasticizer oil, and 0.25% sulfur gives a modified-asphalt composition with a viscosity of 15,000 poise at 140° F. (60° C.). This viscosity, however, greatly exceeds the acceptable viscosity range set by the widely used AC-20R specification for paving asphalt. This specification, issued by the Federal Highway Administration, requires bitumen compositions to have a viscosity in the range of 1600–2400 poise at 140° F. (60° C). Thus, the modified bitumen compositions produced by the procedures of U.S. Pat. No. 4,145,322 using Kraton®-4141 would be unacceptable for use in road paving under the AC-20R specification.

The second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand. a storage stable bitumen composition would provide for only minimal viscosity increases and, accordingly, after storage it can still be employed for its intended purpose.

The third factor complicating the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

Previously, various polymers have been added to asphalts to improve physical and mechanical performance properties. Polymer-modified asphalts are routinely used in the road construction/maintenance and roofing industries. Conventional asphalts often do not retain sufficient elasticity in use and, also, exhibit a plasticity range that is too narrow for use in many modem applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics.

The bituminous binders, even of the bitumen/polymer type, which are employed at the present time in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes cross-linking of the polymer molecules until the desired asphalt properties are met. This reactant typically is sulfur in a form suitable for reacting. Such current processes are discussed in various patents such as U.S. Pat. Nos. 4,145, 322 (Maldonado); 5,371,121 (Bellomy); and 5,382,612 (Chaverot), all of which are hereby incorporated by reference.

However, cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

One result of the high viscosities experienced at increased polymer concentrations is that it makes emulsification of the asphalt difficult. As is known in the art and used herein, emulsification of asphalt refers to forming an emulsion of asphalt and water. Asphalt emulsions are desirable in many applications because the emulsion may be applied at lower temperatures than hot-mix asphalts because the water acts as a carrier for the asphalt particles.

For example, hot-mix asphalts, mixes of asphalt, aggregate, and a single polymer, commonly are applied at a temperature of 350° Fahrenheit (F) to 450° F. (177° Centigrade (C) to 232° C.) to achieve the requisite plasticity for application. In comparison, an asphalt emulsion typically may be applied at 130° F. to 170° F. (54° C to 77° C.) to achieve the same working characteristics. Emulsified asphalt products are generally used to reduce the release of environmentally-harmful volatile organic compounds normally associated with asphalts diluted with light carrier solvents such as diesel fuel, naphtha, and the like. Emulsification basically requires that the asphalt and any desired performance-enhancing additives be combined with an emulsifying agent in an emulsification mill along with about 20 to 40 percent by weight of water. However, high polymer loading in asphalt produces high viscosities and melting points, making emulsification of the polymer-asphalt composition difficult.

The bitumen/polymer compositions are prepared in practice at polymer contents range from about 3% to 6% by weight of bitumen depending on the nature and the molecular weight of the polymer and the quality of the bitumen. Gelling of the bitumen/polymer composition, which is observed fairly frequently during the preparation of the said composition or while it is stored, occurs as soon as the polymer content of this composition exceeds the above-mentioned threshold. It is thus difficult, in practice, to produce non-gellable bitumen/polymer compositions with a high polymer content, which would act as bitumen/polymer concentrates, and are more economical to prepare and to transport than bitumen/polymer compositions with a lower polymer content, and which could be diluted at the time of use, by addition of bitumen, in order to obtain the corresponding bitumen/polymer binders with a lower polymer content which are usually used to make coatings.

In view of the above, bitumen compositions, which simultaneously meet the performance criteria required for road paving, and which are substantially free of volatile solvent would be advantageous. Additionally, viscosity stable bitumen compositions would be particularly advantageous. Further, a method for efficiently introducing the polymer into the bitumen composition would be desirable. In preparing the composition, significant mixing is needed to insure the uniforrn addition of both the polymer and any crosslinking agents. The crosslinking agents are usually added as a dry powder and mixed with the asphalt compositions.

As can be seen from the above, the art is replete with methods to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a target of the industry to reduce the cost of the polymers and crosslinking agents added to the asphalt without sacrificing any of the other elements.

temperature in the tank is sufficient to allow the stirring of the asphalt and is usually 320° F. or more. A suitable rubber or thermoplastic elastomer is then added and mixing is continued for a period of time. Preferred thermoplastic elastomers are styrene butadiene copolymers having a styrene content of fifty percent (50%) or less. A composition of crosslinking agents comprising zinc-mercaptobenzothiazole and sulfur is introduced to the mixture in the tank. The concentration of the crosslinking agents in the overall composition in the tank should be at least 0.1 percent by weight of zinc-mercaptobenzothiazole and 0.05 to 0.3 percent by weight of sulfur. Elemental sulfur is preferred but sulfur

TABLE 1

Properties of Various Asphalt Grades

| TEST | AASHTO M-226 | | | | | |
| --- | --- | --- | --- | --- | --- | --- |
| | AC 2.5 | AC 5 | AC 10 | AC 20 | AC 30 | AC 40 |
| Viscosity @140° F., poise (AASHTO T-202) | 250 ± 50 | 500 ± 100 | 1000 ± 200 | 2000 ± 400 | 3000 ± 600 | 4000 ± 800 |
| Viscosity @275° F.; cSt, minimum (AASHTO T-201) | 125 | 175 | 250 | 300 | 350 | 400 |
| Pen. @77° F.; minimum AASHTO t-49) | 220 | 140 | 80 | 60 | 50 | 40 |
| Flash Point, COC Minimum ° F. | 325 | 350 | 425 | 450 | 450 | 450 |
| Ductility After TFOT (AASHTO T-179) @77° F., 5 cm/min, minimum | 100 | 100 | 75 | 50 | 40 | 25 |
| Viscosity After TFOT (AASHTO T-179) @140° F., poise minimum | 1000 | 2000 | 4000 | 8000 | 12000 | 16000 |

| TEST | AR1000 | AR2000 | AR4000 | AR8000 | AR16000 |
| --- | --- | --- | --- | --- | --- |
| Viscosity @140° F., poise (AASHTO T-202) | 1000 ± 250 | 2000 ± 500 | 4000 ± 1000 | 8000 ± 2000 | 16000 ± 4000 |
| Viscosity @275° F., cSt. minimum (AASHTO T-201) | 140 | 200 | 275 | 400 | 500 |
| Pen @77° F. minimum (AASHTO T-49) | 65 | 40 | 25 | 20 | 20 |
| Percent of Original Pen. @77° F., minimum | — | 40 | 45 | 50 | 52 |
| Ductility @77° F. minimum, 5 cm/min | 100 | 100 | 75 | 75 | 75 |

It is desirable to overcome the above-described difficulties and to produce non-gellable bitumen/polymer compositions with a high polymer content, which would act as bitumen/polymer concentrates. Such concentrates are more economical to prepare and to transport than bitumen/polymer compositions with a lower polymer content, and which could be diluted at the time of use, by addition of bitumen, in order to obtain the corresponding bitumen/polymer binders with a lower polymer content for use in road paving.

It is also desirable to be able to formulate the amount of dilution required at time of use, and satisfy desired paving asphalt specifications. Most, preferably are concentrates that have dilution characteristics that are predictable.

SUMMARY OF THE INVENTION

The present invention provides a method for preparing a bitumen and thermoplastic elastomer composition that is advantageous for concentrations of elastomer greater than 4 percent by weight of asphalt concrete. In accordance with one embodiment of the present invention, the bitumen is heated up to the desired temperature in a stirred tank. The donating compounds are also utilized. The styrene butadiene elastomer and crosslinking agents utilized in one embodiment comprised Finaprene® FP502: ZMBT (zinc 2-mercaptobenzothiazole): S (sulfur) in a 10:0.4:0.2 weight ratio. Utilizing these methods, non-gellable compositions containing 10% or more of elastomer are possible.

In another embodiment of this invention, the amount of elastomer to be added to the composition is determined as the greater amount of: the amount determined to satisfy the SHRP m-value and the amount of elastomer determined to satisfy the SHRP RTFO DSR value.

DESCRIPTION OF THE INVENTION

As used herein, the term "bitumen" (sometimes referred to as "asphalt")refers to all types of bitumens, including those that occur in nature and those obtained in petroleum processing. The choice of bitumen will depend essentially on the particular application intended for the resulting bitumen composition. Preferred bitumens have an initial viscosity at 140° F. (60° C.) of 600 to 3000 poise depending on the grade of asphalt desired. The initial penetration range (ASTM D5) of the base bitumen at 77° F. (25° C.) is 50 to 320 dmm, preferably 75 to 150 dmm, when the intended use of the copolymer-bitumen composition is road paving. Bitumens that do not contain any copolymer, sulfur, etc., are sometimes referred to herein as "base bitumen".

As used herein, the term "volatile solvent" refers to a hydrocarbon solvent which has a distillation point or range which is equal to or less than 350° C. Such solvents are known to vaporize to some extent under ambient conditions and, accordingly, pose environmental concerns relating to hydrocarbon emissions.

The term "substantially free of volatile solvent" means that the complete (final) bitumen composition contains less than about 3.5 weight percent of volatile solvent. Preferably, the bitumen composition contains less than about 2 weight percent of volatile solvent and more preferably, less than about I weight percent of volatile solvent.

"Elastomeric Polymers" are natural or synthetic rubbers and include butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated dienes. It is preferred to use styrene/conjugated diene block copolymers, linear, radial, or multi-branched. Styrene/butadiene and styrene/isoprene copolymers having an average molecular weight of between 30,000 and 300,000 have been found to be particularly useful in the present invention.

"Conjugated-dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of example, butadiene, isoprene, I,3-pentadiene, and the like.

"Block copolymers of styrene and conjugated-dienes" refer to copolymers of styrene and conjugated-dienes having a linear or radial, tri-block structure consisting of styrene-conjugated diene-styrene block units which copolymers are represented by the formula:

where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known per se in the art.

Preferably, such tri-block copolymers are derived from styrene and a conjugated-diene, wherein the conjugated-diene is butadiene or isoprene. Such copolymers preferably contain 15 to 50 percent by weight copolymer units derived from styrene, preferably 25 to 35 percent derived from styrene, more preferably 28 to 31 percent derived from styrene, the remainder being derived from the conjugated diene. These copolymers preferably have a number average molecular weight range between 50,000 and 200,000, more preferably between 100,000 and 180,000. The copolymer can employ a minimal amount of hydrocarbon solvent in order to facilitate handling. Examples of suitable solvents include plasticizer solvent, which is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" refers to elemental sulfur in any of its physical forms or any sulfur donating compound. Sulfur donating compounds are well known in the art and include various organic compositions or compounds that generate sulfur under the mixing or preparation conditions of the present invention. Preferably, the elemental sulfur is in powder form known as flowers of sulfur.

The term "desired Rheological Properties" refers to bitumen compositions having a viscosity at 140° F. (60° C.) of from 1600 to 4000 poise before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging. Each of these desired Rheological Properties are necessary parameters in meeting the AC-20(R) specifications for bitumen compositions suitable for use as road pavement material (See Table 1).

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛-inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325°+/−5° F. (1630+/−2.8° C.) for seven days. Preferably the viscosity does not increase by a factor of two or more during storage at 325° F. (163° C.) for seven days. More preferably the viscosity increases less than 50% during seven days of storage at 325OF (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially unblown or unoxidized solid or semi-solid materials at room temperature that gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) AR viscosity system, also known as SHRP (Superpave Highway Research Program). Two sets of typical specifications are shown in Table 1.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052), which is hereby incorporated by reference in its entirety. For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBR) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62–65 of the booklet include a table entitled Performance Graded Asphalt Binder Specifications. The asphalt compositions are given performance grades, for example, PG 64–22. The first number, 64, represents the average 7-day maximum pavement design temperature in ° C. The second number, −22, represents the minimum pavement design temperature in ° C. Other requirements of each grade are shown in the table. For example, the maximum value for the PAV-DSR test (° C.) for PG 64–22 is 25° C.

Industry custom uses the short form RTFO DSR to indicate the temperature at which a sample will show sufficient rutting resistance after rolling thin film oven (RTFO) aging (minimum rutting resistance as defined as a "$G^*/\sin \delta$" over 2.20 kPA and measured by a dynamic shear rheometer (DSR)). Similarly, m-value is the short form to indicate the minimum temperature in degrees Centigrade at which a sample will exceed an m-value of 0.300 after 60 seconds of loading on the bending beam rheometer.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifty centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut in one thirds, three equal sections. The softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point.

This invention teaches the preparation of asphalt and polymer compositions which can be made to have properties that comply with Federal standards for grade AC-20. In one embodiment the invention includes the method for preparing asphalt and polymer compositions by heating the asphalt in a stirred tank to a temperature sufficient to allow stirring of the asphalt in the tank, wherein said temperature is at least 330° F. but preferably not more than 380° F. A thermoplastic elastomer is added, preferably a styrene-butadiene polymer, to the tank in an amount not greater than twelve percent by weight of the total composition to form a mixture. A crosslinking composition is added to the composition and stirring is continued for at least sixty minutes while either maintaining the temperature in the tank or increasing the temperature by 20 to 50° F.

The crosslinking composition is comprised of at least 0.1 percent by weight based on the asphalt of zinc 2-mercaptobenzothiazole (ZMBT), and from 0.05 to 0.3 percent based on the asphalt of elemental sulfur. The amount of ZMBT added exceeds the amount of sulfur, and preferably, twice as much ZMBT as sulfur is added. In proportion to the amount of elastomer, ZMBT is added in amounts from 4 percent to 10 percent by weight of thermoplastic elastomer and sulfur is added in amounts of 2 percent to 5 percent by weight of thermoplastic elastomer. The composition may be suitable for use as an asphalt/elastomer concentrate when the composition is comprised of at least 8 percent elastomer by weight of asphalt.

Another embodiment of the invention also teaches the preparation of an asphalt composition having properties that comply with or exceed Federal standards for grade AC-20. In accordance with this embodiment, the ratio of elastomer to ZMBT to sulfur is 10.0/0.4/0.2. The similar method comprises heating the asphalt in a stirred tank to a temperature sufficient to allow stirring of the asphalt in the tank, wherein said temperature is at least 330° F. but preferably not more than 380° F. A thermoplastic elastomer is added, preferably a styrene-butadiene polymer, to the tank in an amount not greater than twelve percent by weight of the total composition to form a mixture. The crosslinking composition is added to the asphalt. Stirring is continued for at least sixty minutes while either maintaining the temperature in the tank or increasing the temperature by 20 to 50° F. When the amount of elastomer is from 2 to 12 weight percent, by ratio the amount of ZMBT varies between 0.08 to 0.5 percent and the amount of sulfur varies between 0.04 and 0.25 percent. The composition may be suitable for use as an asphalt/elastomer concentrate when the composition is comprised of at least 8 percent elastomer by weight of asphalt.

This embodiment has been found to have linear relationships between the amount of elastomer and the SHRP properties of m-value and RTFO DSR (least squares correlation coefficient $R^2$ in excess of 0.9 and preferably in excess of 0.98). Using the discovered linear relationships allows final compositions to be formulated by selecting the amount of elastomer to meet SHRP m-value, SHRP RTFO DSR value, or the greater of the two amounts.

Other embodiments of this invention start with asphalt/elastomer concentrates prepared by one of the aforementioned embodiments, then dilute the concentrate with additional asphalt to prepare a final composition. The term "concentrate" here is used to describe a composition having at least 8 percent elastomer by weight of asphalt. The amount of concentrate and asphalt is determined from a dilution ratio defined from a ratio having a numerator and a denominator, the numerator of which is the percent of elastomer desired in the final composition, and the denominator of said dilution ratio is the percent of elastomer present in the asphalt/elastomer concentrate. The final composition prepared by dilution at time of use is comprised of an amount of concentrate equal to the dilution ratio times the amount of total composition desired and remainder of the final composition is comprised of asphalt. When linear relationships are known that correlate SHRP m-value or SHRP RTFO DSR value to the amount of elastomer (for example when a correlation coefficient of at least 0.9 and preferably at least 0.98), the amount of elastomer used in the dilution ratio is the amount of elastomer to meet SHRP m-value, SHRP RTFO DSR value, or the greater of the two amounts. This embodiment also preferably uses a styrene-butadiene polymer as the elastomer and can be made to comply with Federal standards for grade AC-20.

Stirring temperatures depend on the viscosity of the asphalt and can range up to 500° F. Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. flash point may be blended to obtain the desired viscosity asphalt.

Rubbers, elastomeric polymers or thermoplastic elastomers suitable for this application are well known in the art as described above. For example, Finaprene products available from Fina Oil and Chemical Company are suitable for the applications of the present invention. This example is not limiting for the technology, which can be applied to any similar elastomeric product particularly those produced from styrene and butadiene.

U.S. Pat. No. 6,180,697 discloses testing and discovery of preferred cross inking agents comprised of elemental sulfur and organic zinc compounds. The contents of U.S. Pat. No. 6,180,697 are incorporated herein as if set forth in full. In particular, sulfur is used in combination with zinc 2-mercaptobenzothiazole (ZMBT hereafter) and zinc oxide. As in all asphalt formulations, gel formation is problematic. For Example, gels occurred in some experiments when sulfur concentration exceeded 0.3% (relative to asphalt) when 4.0% Finaprene® FP401 elastomer is used. These limitations precluded the development of a bitumen composition with higher concentration of elastomer and crosslinking agents, which could be diluted at time of use.

Surprisingly it has been discovered that the use of high levels of ZMBT relative to sulfur for the crosslinking agents overcomes these limitations. Testing was performed as shown in the tables below. The polymer Finaprene® FP502 was selected for use in the tests due to its beneficial effects in aiding bitumen compositions in passing SHRP (Superpave Highway Research Program testing and grading specifications are maintained by AASHTO). Finaprene® FP502 is a styrene-butadiene block copolymer having. a butadiene/styrene ratio of 69/31 and is available from ATOFINA Petrochemicals, Inc. in Houston, Texas.

Various amounts of FP502 were tested as shown in the tables below. In a preferred embodiment, the ratio of ZMBT to Sulfur is 2:1. Each table represents results for testing upon the base bitumen from a different refinery. The procedure for testing refinery A bitumen/elastomer compositions consisted of adding the elastomer (Finaprene® FP502) and crosslinking agents to a mixing tank containing molten base bitumen at 350° F. with stirring at 2500 RPM for 45 minutes. Stirring was continued for 3 hours at low shear of 500 RPM. The material was allowed to stand without stirring for 24 hours at 325° F. Samples were taken for compatibility testing and SHRP grading. Elemental Sulfur and Zinc 2-mercaptobenzothiazole (ZMBT) were used as the crosslinking agents.

The testing for B refinery bitumen/elastomer compositions was similar. The B refinery test procedure consisted of adding the elastomer (Finaprene® FP502) and crosslinking agents to a mixing tank containing molten base bitumen at 350° F. with stirring at 2500 RPM for 45 minutes. Stirring was continued for 3 hours at low shear of 500 RPM and at a temperature of 380° F. The material was allowed to stand without stirring for 24 hours at 325° F. Samples were then taken for compatibility testing and SHRP grading. Elemental Sulfur and Zinc 2-mercaptobenzothiazole (ZMBT) were used as the crosslinking agents.

TABLE 2

| | Refinery A Bitumen | | | | |
|---|---|---|---|---|---|
| Sample number | 99-189 | 950-96 | 950-97 | 950-100 | 950-98 |
| Base Bitumen wt % | 100.0 | 98.0 | 98.0 | 96.0 | 90.0 |
| Elastomer FP502 wt % | — | 2.0 | 2.0 | 4.0 | 10.0 |
| ZMBT wt % | — | 0.2 | 0.1 | 0.2 | 0.4 |
| S wt % | — | 0.10% | 0.050% | 0.10% | 0.20% |
| Compatibility Test: | | | | | |
| Top number Degrees Fahrenheit | — | 142.2 | 142.3 | 172.1 | 224.4 |
| Compatibility Delta Temp. Degrees F. | — | −0.8 | −0.7 | 4.9 | 3.7 |
| SHRP Testing: | | | | | |
| Binder DSR | 67.7 | 75.7 | 77 | 84.1 | 119.3 |
| RTFO | 69.5 | 75.8 | 77.8 | 84.2 | 109 |
| PAV DSR | 22.9 | 21.8 | 22.3 | 20.5 | 15.5 |
| M-value | −14.58 | −13.88 | −13.85 | −14.14 | −19.85 |
| S-value | −16.34 | −17.25 | −17.26 | −18.29 | −27.72 |
| SHRP Grade | PG64-22 | PG70-22 | PG76-22 | PG82-22 | PG108-28 |

Testing demonstrated that using the crosslinking agents with a high zinc mercaptobenzothiazole (ZMBT) content, relative to sulfur, made compatible compositions containing 10% or more elastomer for base bitumens from two different refineries The SHRP m-value is a key property that normally determines the low temperature SHRP grade. Similarly, RTFO DSR is the key property that normally determines the high temperature SHRP grade value.

TABLE 3

| | Refinery B Bitumen | | | |
|---|---|---|---|---|
| Sample number | 99-229 | 950-103 | 950-101 | 950-102 |
| Base Bitumen wt % | 100.0 | 98.0 | 96.0 | 90.0 |
| Elastomer FP502 wt % | — | 2.0 | 4.0 | 10.0 |
| ZMBT wt % | — | 0.2 | 0.2 | 0.4 |
| S wt % | — | 0.1 | 0.1 | 0.2 |

TABLE 3-continued

Refinery B Bitumen

| Sample number | 99-229 | 950-103 | 950-101 | 950-102 |
|---|---|---|---|---|
| Compatibility Test: | | | | |
| Top number Degrees Fahrenheit | — | 131.5 | 150.6 | 184.7 |
| Compatibility Delta Temp. Degrees F. | — | 0.9 | 0.2 | −9.2 |
| SHRP Testing: | | | | |
| Binder DSR | 65.8 | 71.9 | 78.5 | 112.1 |
| RTFO DSR | 64.9 | 69.5 | 74.4 | 98.3 |
| PAV DSR | 25.1 | 23.9 | 22.6 | 17.4 |
| M-value | −13.85 | −14.21 | −15.42 | −17.68 |
| S-value | −13.38 | −14.42 | −15.17 | −21.25 |
| SHRP Grade | PG64-22 | PG64-22 | PG70-22 | PG98-27 |

Elastomers and crosslinking agents are significant cost components for a resulting bitumen/elastomer composition. In general elastomers and crosslinking agents are many times more expensive than the base bitumen. As a result, reducing the percent of elastomer and crosslinking agents while satisfying SHRP grade requirements is desirable. This invention further discloses methods by which the elastomer and crosslinking agents are reduced to their lowest practical percentages while still satisfying SHRP grade requirements. The above table shows that the utilization of a high ZMBT content relative to sulfur, resulted in acceptable formulations, even when containing 10 percent or more elastomer, with base bitumens.

Figure 2:
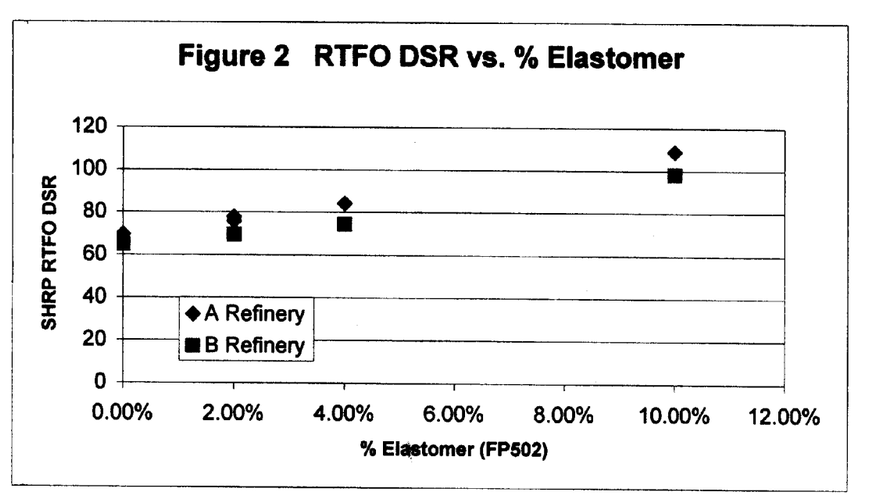
FIG. 2 shows a plot of experimentally determined SHRP RTFO DSR value as a function of percent elastomer content in the bitumen/elastomer composition, including data from testing performed on compositions comprised of bitumen from two different refineries.

As seen in FIG. 2, adding elastomer increases the RTFO DSR temperature of compositions comprised of refinery A bitumen approximately 15% more than when added to refinery B bitumen compositions. Hence, for a given required increase in RTFO DSR, approximately 15% less elastomer is required with the refinery A bitumen.

Figure 1:
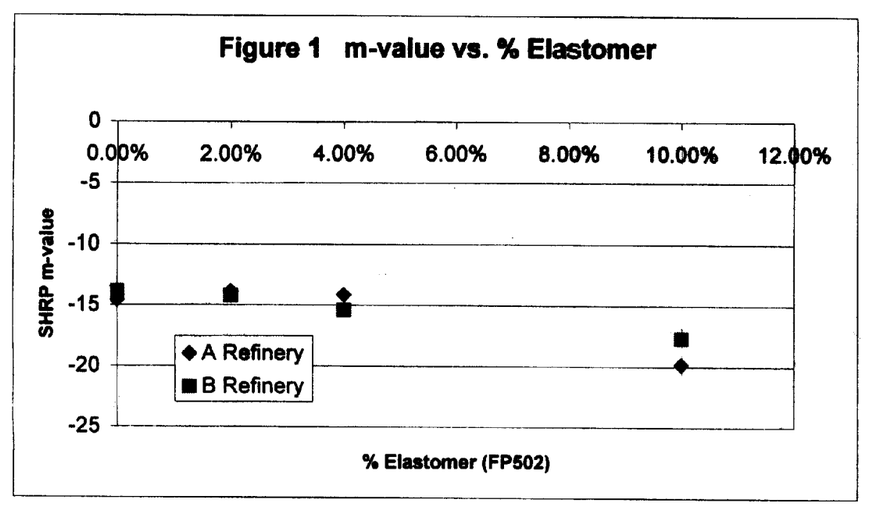
FIG. 1 shows a plot of experimentally determined SHRP m-value as a function of percent elastomer content in the bitumen/elastomer composition, including data from testing performed on compositions comprised of bitumen from two different refineries.

Tables 4 and 5 demonstrate how final product formulation is accomplished from the linear least squares determinations. These tables use the results of FIG. 1 and FIG. 2 to determine the amount of elastomer needed to obtain a required m-value or RTFO DSR value. Table 4 indicates the percent of elastomer required to achieve a particular SHRP m-value in a bitumen/elastomer composition. For example, in order to achieve an m-value of −15, the amount of elastomer required with refinery B bitumen is 3.3%.

Table 5 indicates the percent of elastomer required to achieve a particular SHRP RTFO DSR value in a bitumen/elastomer composition. This table is constructed at an interval of approximately 2 degrees Fahrenheit. Smaller intervals may also be used.

TABLE 5

% Elastomer to Satisfy m-Value

| Required SHRP m-value | % Elastomer Required with Refinery A Bitumen (original equation) | % Elastomer Required with Refinery A Bitumen (modified equation) | % Elastomer Required with Refinery B Bitumen |
|---|---|---|---|
| −12 | 0.0 | 0.0 | 0.0 |
| −13 | 0.0 | 1.3 | 0.0 |
| −14 | 1.5 | 2.6 | 0.8 |
| −15 | 3.2 | 3.9 | 3.3 |
| −16 | 4.8 | 5.2 | 5.8 |
| −17 | 6.5 | 6.6 | 8.3 |
| −18 | 8.1 | 7.9 | 10.8 |
| −19 | 9.8 | 9.2 | 13.3 |
| −20 | 11.4 | 10.5 | 15.8 |
| −21 | 13.1 | 11.8 | 18.4 |
| −22 | 14.7 | 13.1 | 20.9 |

TABLE 6

% Elastomer to Satisfy RTFO DSR Value

| Required SHRP RTFO DSR value | % Elastomer Required with Refinery A Bitumen | % Elastomer Required with Refinery B Bitumen |
|---|---|---|
| 64 | 0.0 | 0.3 |
| 70 | 0.3 | 2.0 |
| 76 | 1.8 | 3.8 |
| 82 | 3.3 | 5.5 |
| 84 | 3.8 | 6.1 |
| 86 | 4.3 | 6.7 |
| 88 | 4.8 | 7.3 |
| 90 | 5.3 | 7.9 |
| 92 | 5.8 | 8.5 |
| 94 | 6.3 | 9.0 |
| 96 | 6.8 | 9.6 |
| 98 | 7.3 | 10.2 |
| 100 | 7.8 | 10.8 |
| 102 | 8.3 | 11.4 |
| 104 | 8.8 | 12.0 |

The final product formulation can be accomplished through either direct formulation or dilution of concentrate formulation. During direct formulation the final composition is created initially. In contrast formulation from dilution of concentrate first produces a composition containing higher percentage of elastomer and crosslinking agents to which additional bitumen is added to obtain the desired final product.

Direct formulation of a desired final bitumen/elastomer composition starts with a customer specified SHRP grade. Based upon the AASHTO standard for that SHRP grade, the required m-value and RTFO DSR values are found in the applicable AASHTO standard. The required percentage of elastomer is determined for both the m-value (from FIG. 1) and the RTFO DSR value (from FIG. 2). The amount of required percent of elastomer is determined as the higher of the two results. Crosslinking agents are added in amounts proportional to those stated in Table 2 (refinery A Bitumen) and Table 3 (refinery B bitumen) for 10% elastomer.

For example, a product formulation for an SHRP grade of PG82–28 requires an m-value of -18 and a RTFO DSR value of 82. Table 4 indicates that to satisfy the m-value requirement requires 8.1% of elastomer to be used with the A refinery bitumen or 10.8% of elastomer to be used with B refinery bitumen. Similarly, Table 5 indicates that to satisfy the RTFO DSR value requires 3.3% elastomer to be used with the A refinery bitumen and 5.5% elastomer to be used with the B refinery bitumen. Taking the higher value, a bitumen/elastomer composition meeting the SHRP grade of PG82–28 can be met with a formulation containing 8.1% elastomer in A refinery bitumen or 10.8% elastomer in B refinery bitumen. Crosslinking agents are added in amounts proportional to those stated in Table 2 (0.32% ZMBT, 0.16% S for refinery A bitumen) or Table 3 (0.22% ZMBT, 0.11% S for refinery B bitumen.)

As an alternate to direct formulation of the final product, a concentrate composition can be prepared of bitumen/elastomer/crosslinking agents which is in turn diluted with bitumen to form the final product. Such a concentrate is comprised of elastomer and crosslinking agents in relatively higher percentages. The concentrate preferably contains from 8 percent to 12 percent of elastomer with crosslinking agents that cause compatibility between the bitumen and elastomer.

Using the dilution method, the amount of elastomer in the final product formulation is determined in the same manner as previously described. In addition a dilution ratio is calculated as:

Dilution Ratio=(% elastomer in product)/(% elastomer in concentrate)

This dilution ratio indicates the percent of concentrate that is to be blended with base bitumen in the final product. Adjustment for the amount of crosslinking agents in the final product is not made as the amount of crosslinking agents in the final product is proportional to the amount of crosslinking agents in the concentrate composition.

As an illustrative example of diluting a concentrate for a final product consider the example of formulating for an SHRP grade of PG82–28. The final product requires an m-value of −18 and a RTFO DSR value of 82. Table 4 indicates that to satisfy the m-value requirement requires 8.1% of elastomer to be used with the refinery A bitumen. Similarly, Table 5 indicates that to satisfy the RTFO DSR value requires 3.3% elastomer to be used with the refinery A bitumen. Taking the higher value, a bitumen/elastomer composition meeting the SHRP grade of PG82-28 can be met with a formulation containing 8.1% elastomer in refinery A bitumen. When using a concentrate containing 12% elastomer (including ZMBT 0.5%, S 0.25%) and 88% bitumen, the dilution ratio is 0.675 (8.1/12.0). During use 67.5% of concentrate is diluted with 32.5% refinery A bitumen to create the final product.

While certain representative embodiments and details have been shown for the purpose of illustrating the subject invention, it will be apparent to those skilled in the art that various changes and modifications can be made therein without departing from the scope of the subject invention.

What we claim is:

1. A method for preparing asphalt and polymer compositions comprising:

heating the asphalt in a stirred tank to a temperature sufficient to allow stirring of the asphalt in the tank, wherein said temperature is at least 330° F.;

adding a thermoplastic elastomer to the tank in an amount not greater than twelve percent by weight of the total composition to form a mixture;

adding a crosslinking composition to the composition;

continue stirring and maintain the temperature in the tank for at least sixty minutes, wherein the crosslinking composition comprises at least 0.1 percent by weight based on the asphalt of zinc 2-mercaptobenzothiazole, and from 0.05 to 0.3 percent based on the asphalt of elemental sulfur, and wherein zinc 2-mercaptobenzothiazole is present in an amount greater than the elemental sulfur.

2. The method of claim 1 wherein the temperature is increased from 20 to 50 degrees Fahrenheit during continued stirring for at least sixty minutes.

3. The method of claim 1 wherein the ratio of zinc 2-mercaptobenzothiazole to elemental sulfur is 2.0/1.0.

4. The method of claim 1 wherein the crosslinking composition comprises at least 0.1 percent by weight based on the asphalt of zinc 2-mercaptobenzothiazole, from 0.05 to 0.3 percent based on the asphalt of elemental sulfur, wherein zinc 2-mercaptobenzothiazole is present in an amount greater than the elemental sulfur, and wherein zinc 2-mercaptobenzothiazole is present in amounts from 4 percent to 10 percent by weight of thermoplastic elastomer.

5. The method of claim 1 wherein the crosslinking composition comprises at least 0.1 percent by weight based on the asphalt of zinc 2-mercaptobenzothiazole, from 0.05 to 0.27 percent based on the asphalt of elemental sulfur, wherein zinc 2-mercaptobenzothiazole is present in an amount greater than the elemental sulfur, and wherein elemental sulfur is present in amounts from 2 percent to 5 percent by weight of thermoplastic elastomer.

6. The method of claim 1 wherein the asphalt is heated to a temperature not greater than 380° F. prior to the addition of the crosslinking composition.

7. The method of claim 1 wherein the thermoplastic elastomer is a styrene-butadiene polymer.

8. The asphalt composition made in accordance with claim 1 wherein the asphalt properties comply with Federal standards for grade AC-20.

9. The method of claim 1 wherein the composition is suitable for use as an asphalt/elastomer concentrate and wherein the elastomer is comprised of at least 8 percent elastomer by weight of asphalt.

10. A method for preparing asphalt and polymer compositions comprising:

heating the asphalt in a stirred tank to a temperature sufficient to allow stirring of the asphalt in the tank, wherein said temperature is at least 330° F.;

adding a thermoplastic elastomer to the tank in an amount not greater than twelve percent by weight of the total composition to form a mixture;

adding a crosslinking composition to the composition;

continue stirring and maintain the temperature in the tank for at least sixty minutes, wherein the crosslinking composition comprises zinc 2-mercaptobenzothiazole and elemental sulfur added in the ratio of elastomer to zinc 2-mercaptobenzothiazole to elemental sulfur of 10.0/0.4/0.2.

11. The method of claim 10 wherein elastomer is added in amounts from 2 to 12 percent by weight of asphalt, zinc 2-mercaptobenzothiazole is added in amounts from 0.08 to 0.5 percent by weight of asphalt and sulfur is added in amounts from 0.05 to 0.25 percent by weight of asphalt.

12. The method of claim 10 wherein the thermoplastic elastomer is a styrene-butadiene polymer.

13. The asphalt composition made in accordance with claim 10 wherein the asphalt properties comply with Federal standards for grade AC-20.

14. The method of claim 10 wherein the composition is suitable for use as an asphalt/elastomer concentrate and wherein the elastomer is comprised of at least 8 percent elastomer by weight of asphalt.

15. A method for preparing asphalt and polymer compositions in a final composition from a concentrate comprised of asphalt, elastomer in excess of 8 percent by weight, zinc 2-mercaptobenzothiazole and sulfur wherein the amount of zinc 2-mercaptobenzothiazole is in excess of the amount of sulfur in the concentrate; said method for preparing the composition comprising the steps:

determining a dilution ratio having a numerator and a denominator, the numerator of which is the percent of elastomer desired in the final composition, and the denominator of said dilution ratio is the percent of elastomer present in the asphalt/elastomer concentrate;

diluting asphalt/elastomer concentrate with base bitumen to obtain a final composition at time of use, said final composition further comprised of an amount of concentrate equal to the dilution ratio times the amount of total composition desired and remainder of the final composition is comprised of asphalt.

16. The method of claim 15 wherein the thermoplastic elastomer is a styrene-12 butadiene polymer.

17. The asphalt composition made in accordance with claim 15 wherein the asphalt properties comply with Federal standards for grade AC-20.

* * * * *